US012790463B2

(12) United States Patent
Jin et al.

(10) Patent No.: US 12,790,463 B2
(45) Date of Patent: Nov. 10, 2026

(54) PLASTIC RESIN COMPOSITE COMPRISING METAL OXIDE NANORODS AND PREPARATION METHOD THEREFOR

(71) Applicants: LG ELECTRONICS INC., Seoul (KR); KOREA ADVANCED INSTITUTE OF SCIENCE AND TECHNOLOGY, Daejeon (KR)

(72) Inventors: Taegyu Jin, Seoul (KR); Sanghyun Hong, Seoul (KR); Seongsu Kim, Daejeon (KR); Wonvin Kim, Daejeon (KR); Jae-Moon Jeong, Daejeon (KR); Sangyoon Bae, Daejeon (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 589 days.

(21) Appl. No.: 18/278,765

(22) PCT Filed: Feb. 10, 2022

(86) PCT No.: PCT/KR2022/002029

§ 371 (c)(1),
(2) Date: Aug. 24, 2023

(87) PCT Pub. No.: WO2022/182022

PCT Pub. Date: Sep. 1, 2022

(65) Prior Publication Data

US 2024/0141138 A1 May 2, 2024

(30) Foreign Application Priority Data

Feb. 26, 2021 (KR) ........................ 10-2021-0026557

(51) Int. Cl.
*C08K 7/02* (2006.01)
*C08K 3/22* (2006.01)
*C08K 7/28* (2006.01)
*C08K 9/02* (2006.01)

(52) U.S. Cl.
CPC .................. *C08K 7/02* (2013.01); *C08K 3/22* (2013.01); *C08K 7/28* (2013.01); *C08K 9/02* (2013.01); *C08K 2003/2241* (2013.01); *C08K 2003/2296* (2013.01)

(58) Field of Classification Search
None
See application file for complete search history.

(56) References Cited

U.S. PATENT DOCUMENTS

| | | | | |
|---|---|---|---|---|
| 2011/0224330 | A1* | 9/2011 | Sodano | C08K 7/02 524/424 |
| 2014/0272397 | A1 | 9/2014 | Kim et al. | |
| 2014/0309341 | A1 | 10/2014 | Ribaric | |
| 2017/0058419 | A1 | 3/2017 | Kim et al. | |
| 2019/0040214 | A1 | 2/2019 | Lim et al. | |
| 2020/0231768 | A1* | 7/2020 | Lim | D06M 10/025 |
| 2021/0061992 | A1* | 3/2021 | Tanaka | C08K 7/28 |

FOREIGN PATENT DOCUMENTS

| | | |
|---|---|---|
| KR | 10-2016-0023967 | 3/2016 |
| KR | 10-2017-0025551 | 3/2017 |
| KR | 10-2017-0092767 | 8/2017 |
| KR | 10-2018-0031783 | 3/2018 |
| KR | 10-1919496 | 11/2018 |
| KR | 10-1992598 | 6/2019 |
| KR | 10-2020-0098256 | 8/2020 |

OTHER PUBLICATIONS

Machine translation of Young Bin et al. (KR 101919496). (Year: 2018).*

International Search Report (with English Translation) dated May 31, 2022 issued in Application No. PCT/KR2022/002029.

* cited by examiner

*Primary Examiner* — Robert T Butcher

(74) *Attorney, Agent, or Firm* — KED & ASSOCIATES, LLP

(57) ABSTRACT

The present invention relates to a plastic resin composite comprising metal oxide nanorods and a preparation method therefor. The plastic resin composite comprising metal oxide nanorods according to the present invention is light in weight and has excellent mechanical strength by comprising: a fiber composite, which includes fibers and metal nanorods formed on the surface of the fibers; and a plastic resin combined with the fiber composite via interlocking.

17 Claims, 4 Drawing Sheets

(a)

(b)

PLASTIC RESIN COMPOSITE COMPRISING METAL OXIDE NANORODS AND PREPARATION METHOD THEREFOR

CROSS-REFERENCE TO RELATED PATENT APPLICATIONS

This application is a U.S. National Stage Application under 35 U.S.C. § 371 of PCT Application No. PCT/KR2022/002029, filed Feb. 10, 2022, which claims priority to Korean Patent Application No. 10-2021-0026557, filed Feb. 26, 2021, whose entire disclosures are hereby incorporated by reference.

TECHNICAL FIELD

The present disclosure relates to a plastic resin composite including metal oxide nanorods and a preparing method therefor, more particularly, to a plastic resin composite including metal oxide nanorods with a light weight and an excellent mechanical strength by plasma treatment of fiber and forming metal oxide nanorods on the fibers, and a preparing method for the plastic resin composite including the metal oxide nanorods.

BACKGROUND ART

A composite refers to a material made by artificially mixing or combining materials having different components and physical properties to maximize the properties of each material or to have new properties that are not expressed in a single material.

Such a composite is fundamentally superior to conventional materials in physical properties such as strength, corrosion resistance, fatigue life, abrasion resistance, impact resistance and lightness, so it is a representative 21$^{st}$ century industrial material in the limelight in various fields and widely used in aerospace, sports goods, ships, construction, automobiles and energy fields.

In general, the composite has a basic structure configured of a reinforced material responsible for the load applied to the material and a matrix combined with the reinforcing material to transfer the load to the reinforcing material. As the reinforcing material, various fiber-reinforcing materials such as glass fiber, carbon fiber and aramid fiber are commonly used. as the base material, a resin type material may be used a lot such as thermosetting resin including p phenol and epoxy or thermoplastic resins including polyvinyl chloride (PVC), polyethylene, polypropylene, polyamide, polyacetal, polybutylene terephthalate, and polyphenylene sulfide.

Such the fiber reinforced plastic is a component of synthetic resin and fiber reinforced material, which can additionally obtain advantages such as tensile strength, impact resistance and heat resistance due to the added fiber reinforced material while maintaining advantages of plastic such as corrosion resistance and easy molding.

Since the fiber reinforced plastic is inexpensive and light in weight, it is used in various fields such as diverse electric hole appliances, hulls of small ships, bathtubs, septic tanks, etc. it is a trend that the field of technology using the fiber reinforced plastic is gradually increasing.

In this regard, Korean Patent Publication No. 10-2018-0031783 (published on Mar. 28, 2018) relates to Polyolefin composition containing a hollow glass microsphere, and discloses a composition comprising a polyolefin, hollow glass microspheres, a polar semi-crystalline thermoplastic additive and an impact modifier or compatibilizer.

In addition, Korean Patent Publication No. 10-2017-0092767 (published on Aug. 14, 2017) relates to a carbon fiber reinforced polymer composite having surface-modified carbon fibers through plasma treatment and a preparing method thereof, and discloses a cabinet fiber reinforced engineering plastic composite that may improve room temperature and high temperature mechanical properties and wear and friction properties by adjusting chemical functional groups and carbon crystal structure on a surface of carbon fiber through plastic treatment of conventional carbon fiber, and a preparing method thereof.

In addition, USP Publication No. 2014/0309341 (published on Oct. 16, 2014) relates to an injection molded part, compounds and a manufacturing method thereof, and discloses an injection molded part of plastic in which fibers, specifically, cellulosic natural dyes, are added to the plastic.

However, all these plastic composites are intended to improve strength, so they are heavy for use in lightweight plastic products such as those used in automotive interiors. When the plastic composites are used in electric home appliances, there is a problem in that the heavy weight of the plastic composites gives the users body an overhang and consumes a lot of power.

DESCRIPTION OF DISCLOSURE

Technical Problems

Accordingly, an objective of the present disclosure is to provide a plastic resin composite including metal oxide nanorods that includes a fiber as a reinforcing material and forms the metal oxide nanorods on the fiber, thereby giving no burden on users due to its weight and having an excellent strength to be used in various plastic products.

Further, another objective of the present disclosure is to provide a preparing method of a plastic resin composite including metal oxide nanorods that has an excellent strength even with a light weight.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

To solve the above-mentioned disadvantages, a plastic resin composite comprising metal oxide nanorods, the plastic resin composite may include the metal oxide nanorods formed on a surface of a fiber provided as an reinforcing material; and a plastic resin.

Specifically, the plastic resin composite including the metal oxide nanorods according to the present disclosure may include a fiber composite comprising a fiber and a fiber composite comprising metal oxide nanorods formed on a fiber surface; and a plastic resin combined with the fiber composite by interlocking.

In the plastic resin composite including the metal oxide nanorods according to the present disclosure, the metal oxide nanorods formed on the fiber surface may be formed to improve a bonding force with the plastic resin. The fiber may be plasma-treated to improve the bonding force between the fiber and the metal oxide nanorods.

As described above, the plastic resin composite including the metal oxide nanorods according to the present disclosure may the fiber on which the metal oxide nanorods are formed, thereby improving a mechanical strength even with a light weight.

At this time, the fiber may be at least one selected from a group consisting of a lyocell fiber, a glass fiber and an aramid fiber. The metal oxide may be zinc oxide or titanium oxide.

The plastic resin may be at least one selected from a group consisting of acrylonitrile butadiene styrene ABS, polycarbonate PC and polypropylene PP.

The fiber composite may be included in 15 to 35% by volume with respect the total volume of the plastic resin composite.

According to the present disclosure, a preparing method of a plastic resin composite comprising metal oxide nanorods, the preparing method may include performing plasma treatment on a fiber surface; forming nucleus of metal oxide on the plasma-treated fiber surface; forming metal oxide nanorods on the fiber surface; and mixing the fiber having the metal oxide nanorods formed thereon with a plastic resin.

The plasma treatment may be performed t a power of 900 to 1100 W, a frequency of 40 to 60 kHz, and a flow rate of 40 to 60 sccm.

The forming of the metal oxide nucleus may be performed by using an ethanol solution and zinc acetate when the metal oxide nanorods comprise zinc oxide, and using a sulfuric acid solution and tetrabutyl titanate TBT when it comprises titanium oxide.

The forming of the metal oxide nucleus may be performed at 50 to 70° C. for 10 to 20 minutes.

The forming of the metal oxide nucleus may be performed by using zinc nitrate hydrate and hexamethylenetetramine in case of zinc oxide, and using an acetic acid solution and titanium isopropoxide in the case of titanium dioxide.

The forming of the metal oxide nucleus may be performed at 85 to 105° C. for 6 to 8 hours.

The preparing method of the plastic resin composite comprising the metal oxide nanorods may further include adding glass bubbles after mixing the fiber having the metal oxide nanorods formed thereon with the resin.

The fiber having the metal oxide nanorods formed thereon, the resin and the glass bubbles may be included in 5 to 15% by weight, 60 to 80% by weight and 15 to 25% by weight, respectively.

Advantageous Effect

According to the present disclosure, the plastic resin composite according to the present disclosure may use the fiber as strength reinforcing material to reinforce the decreased strength, and grow the metal oxide nanorods on the surface of the fiber to increase the contact area between the plastic resin and the fiber, thereby increasing the bonding force between the fiber and the plastic resin.

In addition, the plastic resin composite including the metal oxide nanorods according to the present disclosure may be variously applied to plastic components requiring a light weight, thereby reducing power consumption due to weight reduction during operation.

In addition, the plastic resin composite including the metal oxide nanorods according to the present disclosure may reduce the load on the body such as the wrist in case of products such as floor-centered vacuum cleaners, drones and dryers that people directly carry and move.

Specific effects are described along with the above-described effects in the section of Detailed Description.

DETAILED DESCRIPTION OF EXEMPLARY EMBODIMENT

Figure 1:
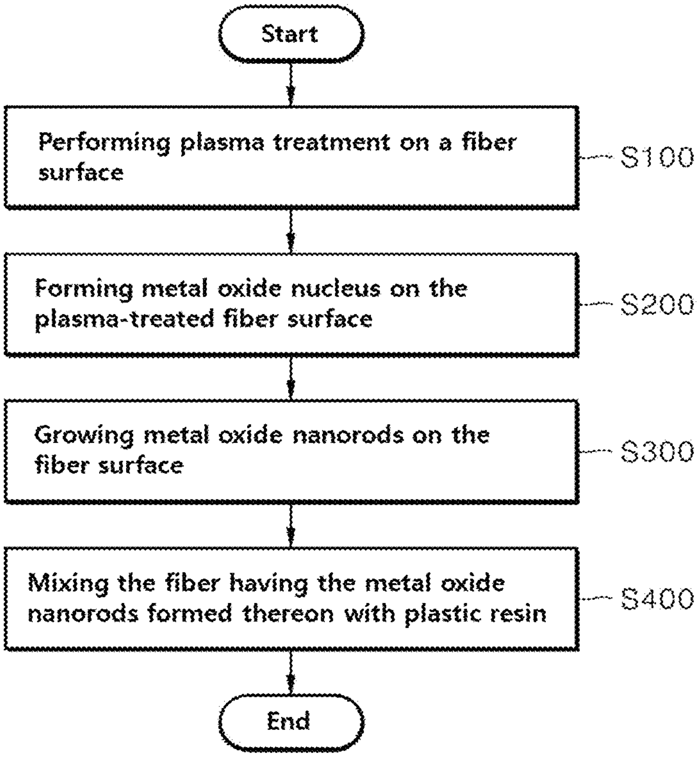
FIG. 1 is a flow chart showing a preparing method of a plastic resin composite including metal oxide nanorods according to the present disclosure.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The terms “first”, “second” and the like are used herein only to distinguish one component from another component. Thus, the components should not be limited by the terms. Certainly, a first component can be a second component unless stated to the contrary.

Throughout the disclosure, each component can be provided as a single one or a plurality of ones, unless explicitly stated to the contrary.

The singular forms “a”, “an” and “the” are intended to include the plural forms as well, unless explicitly indicated otherwise. It should be further understood that the terms “comprise” or “include” and the like, set forth herein, are not interpreted as necessarily including all the stated components or steps but can be interpreted as excluding some of the stated components or steps or can be interpreted as including additional components or steps.

Hereinafter, a plastic resin composite including metal oxide nanorods and a preparing method of the plastic resin composite including the metal oxide nanorods will be described.

The present disclosure may provide a plastic resin composite including metal oxide nanorods including a fiber composite including a fiber and metal oxide nanorods formed on a surface of the fiber; and a plastic resin coupled to the fiber composite by interlocking.

Conventionally, various adhesives such as glass bubbles may be used to reduce the weight of plastic, but in this case, a problem could occur in that the strength is generally lowered.

Fibers can be used as a reinforcing material to reinforce strength. However, when using fibers alone, there is a problem in that there is no strength reinforcing effect.

In contrast, the plastic resin composite according to the present disclosure may use fibers as strength reinforcing material, and grow metal oxide nanorods on a surface of the fiber to increase the contact area between the plastic resin and the fiber, thereby increasing the bonding force between the fiber and the plastic resin.

In addition, the plastic resin composite including the metal oxide nanorods according to the present disclosure may be variously applied to plastic components requiring a light weight. As a result, power consumption due to weight reduction during operation may be reduced.

Further, the plastic resin composite including the metal oxide nanorods according to the present disclosure may reduce the load on the body such as the wrist in case of products such as floor-centered vacuum cleaners, drones and dryers that people directly carry and move.

The plastic resin composite including the metal oxide nanorods may include a fiber composite including a fiber and metal oxide nanorods, and a plastic resin.

The fiber may be a natural fiber or an artificial fiber. When it is a natural fiber, the fiber is a product name of natural fiber called Lyocell as fiber extracted from nature. It is a new material fiber that combines silky soft feel, natural color, solid durability, comfortable fit, luxury and practicality at the same time, so it has recently in the limelight in various fields.

The lyocell fiber used in the present disclosure uses eucalyptus tree pulp as a raw material, and it has excellent absorbency and is soft to touch, so it may be a fabric mainly used for children's clothes, innerwear and bedding. Also, the lyocell has more eco-friendly production process than rayon and it biodegrades in about a month if buried in the ground.

In addition, since it has a flexible process, high crystallinity, long crystallites, high orientation and high orientation of amorphous regions, etc., the lyocell fiber has high dry and wet tensile strength, high wet strength and high loop tenacity.

Accordingly, the fiber is an artificial fiber, a glass fiber or an aramid fiber may be used. However, it is preferred to use the lyocell fiber in that the lyocell fiber is a natural fiber capable of bolding with plastic resin and biodegradable.

The fiber composite may form metal oxide nanorods on the surface of the fiber to improve the bonding strength with the plastic resin, and zinc oxide or titanium dioxide may be used as the metal oxide.

In addition, at least one selected from the group consisting of acrylonitrile butadiene styrene, polyalkylene carbonate, and polyurethane may be used as the plastic resin.

Among the plastic resins, acrylonitrile butadiene styrene is a thermoplastic resin that reinforces the shortcomings of polystyrene and disadvantages of AD resin or impact-resistant polystyrene. Also, it improves mechanical strength, heat resistance, oil resistance, weather resistance, etc. while maintaining excellent permeability, processability and electrical properties of polystryrene. Also, the acrylonitrile butadiene styrene has a easy process, and strong impact resistance and heat resistance, so there is an advantage of being widely used as a metal substitute for interior and exterior materials for automobiles as well as home appliances.

Preferably, the fiber composite is included in an amount of 15 to 35% by volume based on the total volume of the plastic resin composite. When the fiber composite is included in less than 15% by volume, the strength improvement effect is insignificant. When the fiber composite exceeds 35% by weight, there is a problem in that the probability of occurrence of internal defects increases due to low dispersibility of the fiber.

In the plastic resin composite including the metal oxide nanorods according to the present disclosure, mechanical strength of the plastic resin composite may be improved because the metal oxide nanorods area formed on the fiber and interlocking with the plastic resin improves interfacial bonding force.

The present disclosure may provide a preparing method of the plastic resin composite including the metal oxide nanorods may include steps of: performing plasma treatment on the fiber surface;

forming nuclei of the metal oxide on the surface of the plasma-treated fiber;

forming metal oxide nanorods on the fiber surface; and mixing the fiber, on which the metal oxide nanorods are formed, with a plastic resin.

FIG. 1 is a flow chart showing a preparing method of a plastic resin composite including metal oxide nanorods according to the present disclosure.

Referring to FIG. 1, the present disclosure will be described in detail.

The preparing method of the plastic resin composite including the metal oxide nanorods according to the present disclosure may include the step of performing plasma treatment on the fiber surface S100.

One or more selected from a group constituting of a lyocell fiber, a glass fiber and an aramid fiber may be used as the fiber.

At this time, the fiber may improve the bonding strength with the metal oxide nanorods formed on the fiber by performing the plasma treatment on the fiber.

The plasma treatment may be preparably performed at a power of 900 to 1100 W, a frequency of 40 to 60 kHz and a flow rate of 40 to 60 sccm. When the plasma treatment is output of the above-mentioned range, there is a problem in that the bonding strength with the metal oxide nanorods formed on the fiber may not be sufficiency and there is another problem in that the fiber is damaged.

Next, the preparing method of the plastic resin composite including the metal oxide nanorods according to the present disclosure may include the step S200 of forming the nuclei of the metal oxide on the plasma-treated fiber surface.

At this time, zinc oxide or titanium dioxide may be used as the metal oxide. The Nucleation of the metal oxide may be performed by using an ethanol solution and zinc acetate when the metal oxide nanorod is zinc oxide. It may be performed by using a sulfuric acid solution and tetrabutyl titanate TBT, when the metal oxide nanorod is titanium dioxide.

The nucleation of the metal oxide is preferably performed at 50 to 70 50 to 70° C. for 10 to 20 minutes. When the metal oxide nucleus is formed out of the range of temperature and time, there is a problem in that the nucleus of the metal oxide nanorod formed on the fiber surface is not formed.

The preparing method of the plastic resin composite including the metal oxide may include the step of forming the metal oxide nanorod on the fiber surface S300.

The bonding between the fiber and the plastic resin may be increased by forming the metal oxide nanorods on the fiber surface.

In case of zinc oxide, the formation of the metal oxide nanorods may be performed by using zinc nitrate hydrate and hexamethylenetetramine. In case of titanium dioxide, it may be performed by using an acetic acid solution.

The formation of the metal oxide nanorods may be performed at 85 to 105° C. for 6 to 8 hours. When the metal oxide are formed out of the above-mentioned temperature and time ranges, there is a problem in that the metal oxide is not formed in the form of nanorods.

The preparing method of the plastic resin composite including the metal oxide nanorods may include the step S400 of mixing the fiber having the metal oxide nanorods formed thereon with a resin.

At this time, the interfacial bonding force of fiber may be improved due to interlocking between the plastic resin and the metal oxide nanorods formed on the fiber, thereby improving the strength of the plastic resin composite.

The preparing method of the plastic resin composite including the metal oxide nanorods may further include a step of adding glass bubbles after mixing the fiber having the metal oxide nanorods with the plastic resin.

Preferably, the fiber having the metal oxide nanorods formed thereon, the plastic resin and the glass bubbles may be included in an amount of 5 to 15 wt %, 60 to 80 wt %, and 15 to 25 wt %, respectively. when the glass bubbles are included in an amount of less than 15% by weight, there is a problem in that the specific gravity of the plastic resin composite is increased to reduce the weight reduction effect. When the glass bubbles are included in an amount of more than 25% by weight, there is a problem in that the portion where the interfacial bonding force between the glass bubbles and the resin is lowered and the tensile strength reinforcing effect is lowered due to the lowered due to the lowered fiber content.

Hereinafter, the present disclosure will be described in detail through embodiments. Such embodiments are only to be exemplified to describe the present disclosure in detail. The present disclosure is not limited the embodiments.

EMBODIMENTS

Embodiment 1: Plastic Resin Composite Preparing 1

Figure 2:
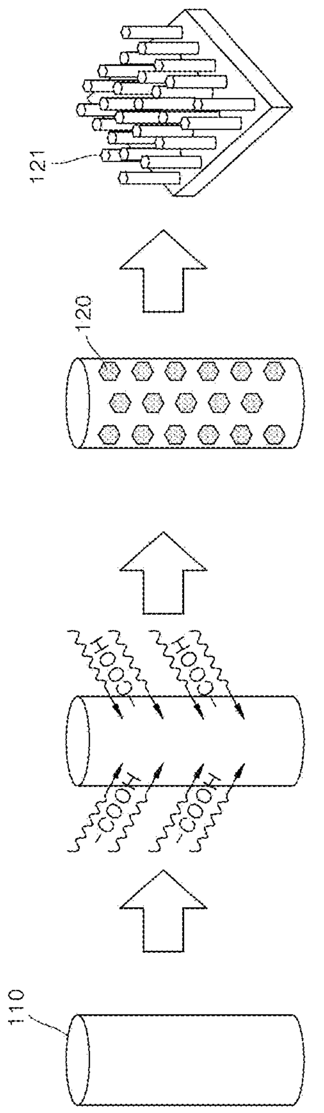
FIG. 2 is a schematic view showing a preparing method of a fiber composite having metal oxide nanorods formed therein in the plastic resin composite including the metal oxide nanorods.

FIG. 2 is a schematic view showing a preparing method of a fiber composite having metal oxide nanorods formed therein in the plastic resin composite including the metal oxide nanorods. Following description refers to FIG. 2.

1. Preparing a Fiber Composite 100:

1) Performing Plasma-Treatment of Fiber:

After spreading the lyocell fiber 100 thinly on a plate, oxygen plasma treatment was performed for 1 minute at 1000 W power, 50 kHz frequency and 50 sccm flow rate, and oxygen plasma treatment was also performed on the opposite side of the lyocell fiber 110 under the same conditions.

2) Forming Nucleus 120 of the Metal Oxide:

a seed solution was prepared by stirring zinc acetate and 0.25MNaOH in an ethanol solution with a magnetic stirrer at 60° C. until it becomes transparent. After that, the lyocell fiber 110 was treated with the seed solution at 60° C. for 15 minutes. The treated lyocell fiber 110 was dried in an oven at 120° C. for 15 minutes.

3) Growing the Metal Oxide Nanorods 121:

After 0.01 M zinc nitrate hydrate and 0.01 M hexamethylenetetramine were mixed, the mixture was added to the lyocell fiber 110 treated with the seed solution and a growing process was performed at 95° C. for 7 hours. In order to grow the zinc oxide nanorods 121 of an appropriate length from the lyocell fiber 110, the growing processes were performed twice.

Figure 3:
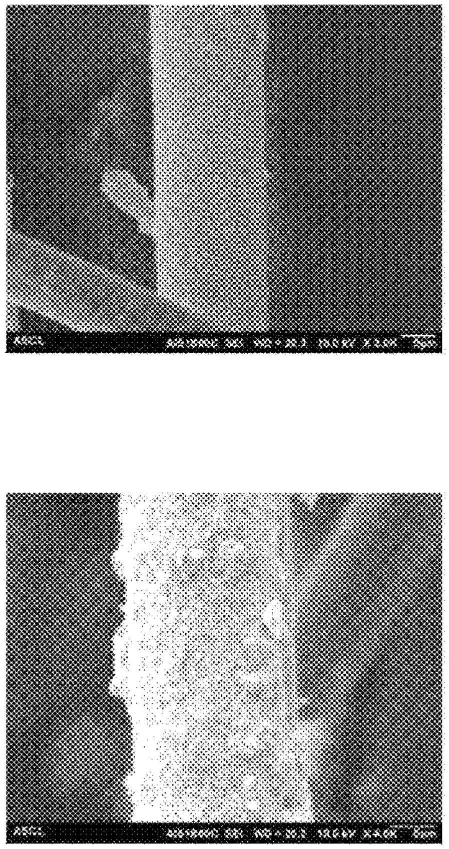
FIG. 3 is a scanning electron micrograph showing lyocell fibers in which zinc oxide nanorods are formed in the plastic resin composite including the metal oxide nanorods.

FIG. 3 is a scanning electron micrograph (i.e., SEM) showing lyocell fibers in which zinc oxide nanorods are formed in the plastic resin composite including the metal oxide nanorods. FIG. 3(*a*) is a scanning electron micrograph of a lyocell fiber having zinc oxide nanorods and FIG. 3(*b*) is an enlarged picture of FIG. 3(*a*).

2. Preparing a Plastic Resin Composite:

The lyocell fiber having the zinc oxide nanorods (i.e., fiber composite) prepared as described above was added in 15% by volume to acrylonitrile butadiene styrene ABS, to prepare a plastic resin composite.

Embodiment 2: Plastic Resin Composite Preparation 2

A plastic resin composite was prepared in the same method as the plastic composite of Embodiment 1 except that a plastic resin composite was prepared by adding 22% by volume of the lyocell fiber having the zinc oxide nanorods formed thereon in Embodiment 1 to acrylonitrile butadiene styrene (ABS).

Embodiment 3: Plastic Resin Composite Preparation 3

A plastic resin composite was prepared in the same method as the plastic composite of Embodiment 1 except that a plastic resin composite was prepared by adding 35% by volume of the lyocell fiber having the zinc oxide nanorods formed thereon in Embodiment 1 to acrylonitrile butadiene styrene (ABS).

Embodiment 4: Plastic Resin Composite Preparation 4

A plastic resin composite was prepared by mixing 5 to 15 wt % of the lyocell fiber on which the zinc oxide nanorods prepared in Embodiment 1 are formed, 15 to 25 wt % of glass bubbles, and 60 to 80 wt % of acrylonitrile butadiene styrene (ABS).

Reference Embodiment 1

After treating the surface of the lyocell fiber silane, 22% by volume of acrylonitrile butadiene styrene was added and a composite resin was prepared.

Comparative Embodiment 1

Acrylonitrile butadiene styrene having a diameter of 2 mm was used.

Comparative Embodiment 2

Acrylonitrile butadiene styrene having a diameter of 3 mm was used.

Comparative Embodiment 2

A composite resin was prepared by mixing lyocell fiber in which no zinc oxide nanorods were formed and acrylonitrile butadiene styrene at a volume % of 78:22.

Table 1 below specifically shows constituent materials of Embodiments 1 to 4 and Comparative embodiments 1 to 3.

TABLE 1

| | | Lyocell fiber | | | | |
|---|---|---|---|---|---|---|
| Embodiments | ABS | Non-treatment | Zinc oxide nanoroformation | Silane treatment | Glass bubbles | Total |
| Embodiment 1 | 85% by volume | | 15% by volume | | | 100 |
| Embodiment 2 | 78% by volume | | 22% by volume | | | 100 |
| Embodiment 3 | 65% by volume | | 35% by volume | | | 100 |
| Embodiment 4 | 60 to 80% by weight | | 5 to 15% by weight | | 5 to 15% by weight | 100 |
| Reference embodiment 1 | 78% by volume | | | | | 100 |
| Comparative embodiment 1 | 100% by volume | | | 22% by volume | | 100 |
| Comparative embodiment 2 | 100% by volume | | | | | 100 |
| Comparative embodiment 3 | 78% by volume | 22% by volume | | | | 100 |

EXPERIMENTAL EMBODIMENT

Experimental Embodiment 1: Tensile Strength Analysis of Plastic Resin Composite In the plastic resin composite according to the present disclosure, the tensile strength of the resin prepared in Reference embodiment 1 and Comparative embodiments 1 to 3 was analyzed and the results are shown in FIG. 4.

The tensile strength was measured by the ASTM D638 method using a test device, U.T.M (manufacturer: Instron, model name 466), and the cross heat speed was pulled at 200 mm/min 1T) and then the point at which the specimen was cut was measured. The tensile strength was calculated as follows:

Tensile strength (kgf/mm$^2$)=load value (kgf)/thickness (mm)×width (mm)

Figure 4:
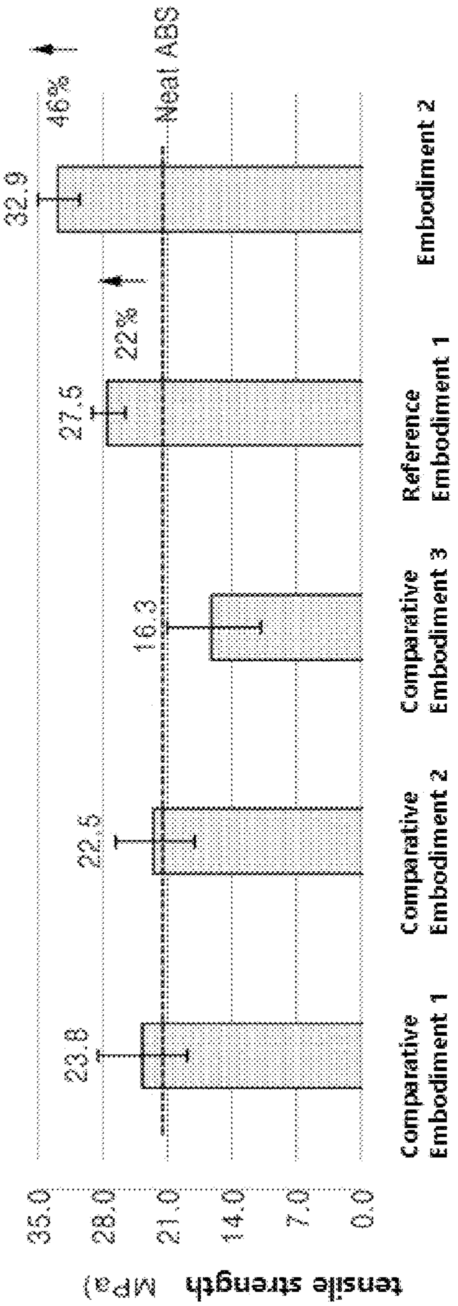
FIG. 4 is a graph showing the tensile strength of the plastic resin composite including the metal oxide nanorods.

As shown in FIG. 4, the tensile strength of the pure lyocell fiber was 23.8 MPa and 22.5 MPa, respectively. The tensile strength of the resin composite of Comparative embodiment 3, to which lyocell was added, had a lower tensile strength of 16.3 MPa, compared to the pure lyocell fiber.

In addition, the composite resin of Reference embodiment 1 had the silane-treated lyocell fiber added thereto, so it had a higher tensile strength than the pure lyocell fiber. However, the tensile the plastic resin composite according to the present disclosure, in which the zinc oxide nanorods are formed on the fiber, was 32.9 Mpa which is higher than the tensile strength of the pure lyocell by 46%.

Accordingly, since the metal oxide nanorods are formed on the fiber in the plastic resin composite according to the present disclosure, the interlocking with the plastic resin may improve the interfacial bonding strength, thereby improving the strength of the plastic resin composite.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

DESCRIPTION OF NUMERAL REFERENCES

100: Fiber composite
110: Fiber
120: Metal oxide nucleus
121: Metal oxide nanorod

The invention claimed is:

1. A plastic resin composite comprising:
a fiber composite including a fiber, and metal oxide nanorods formed on a surface of the fiber; and
a plastic resin interlocked with the fiber composite,
wherein the fiber includes a lyocell fiber, and
wherein the plastic resin composite comprises 15 to 35% by volume of the fiber composite with respect a total volume of the plastic resin composite.

2. The plastic resin composite of claim 1, wherein the metal oxide includes at least one of zinc oxide or titanium oxide.

3. The plastic resin composite of claim 1, wherein the plastic resin includes at least one of acrylonitrile butadiene styrene (ABS), polycarbonate (PC), or polypropylene (PP).

4. The plastic resin composite of claim 1, wherein a method for preparing the plastic resin composite comprises:
performing a plasma treatment on the surface of the fiber;
forming a nucleus of metal oxide on the plasma-treated surface of the fiber;
forming the metal oxide nanorods from the nucleus of metal oxide on the surface of the fiber; and
mixing the fiber having the metal oxide nanorods formed thereon with the plastic resin.

5. The plastic resin composite of claim 4, wherein the plasma treatment is performed at a power of 900 to 1100 W, a frequency of 40 to 60 kHz, and a flow rate of 40 to 60 sccm.

6. The plastic resin composite of claim 4, wherein the metal oxide includes at least one of zinc oxide or titanium oxide.

7. The plastic resin composite of claim 6, wherein the metal oxide nucleus is formed using an ethanol solution and zinc acetate when the metal oxide includes zinc oxide, and is formed using a sulfuric acid solution and tetrabutyl titanate (TBT) when the metal oxide includes titanium oxide.

8. The plastic resin composite of claim 7, wherein the metal oxide nucleus is formed at 50 to 70° C. for 10 to 20 minutes.

9. The plastic resin composite of claim 6, wherein the metal oxide nanorods are formed using zinc nitrate hydrate and hexamethylenetetramine when the metal oxide includes zinc oxide, and the metal oxide nucleus is formed using an acetic acid solution and titanium isopropoxide when the metal oxide includes titanium dioxide.

10. The plastic resin composite of claim 9, wherein the metal oxide nanorods are formed at 85 to 105° C. for 6 to 8 hours.

11. The plastic resin composite of claim 4, wherein the method for preparing the plastic resin composite further comprises:

adding glass bubbles after mixing the fiber having the metal oxide nanorods formed thereon with the plastic resin.

12. The plastic resin composite of claim 11, wherein the fiber having the metal oxide nanorods formed thereon, the plastic resin, and the glass bubbles are included in 5 to 15% by weight, 60 to 80% by weight and 15 to 25% by weight, respectively.

13. The plastic resin composite of claim 4, wherein a process for forming the metal oxide nanorods on the surface of the fiber is performed at least two times to grow the metal oxide nanorods.

14. The plastic resin composite of claim 1, wherein the plastic resin composite has a tensile strength of at least 27.5 Mpa.

15. The plastic resin composite of claim 14, wherein the plastic resin composite has a tensile strength of at least 32.9 Mpa.

16. The plastic resin composite of claim 1, further comprising glass bubbles.

17. The plastic resin composite of claim 16, wherein the fiber composite, the plastic resin, and the glass bubbles are included in 5 to 15% by weight, 60 to 80% by weight and 15 to 25% by weight, respectively with respect to a total weight of the plastic resin composite.

* * * * *